United States Patent [19]

Fukaya et al.

[11] Patent Number: 5,041,399

[45] Date of Patent: Aug. 20, 1991

[54] HARD SINTERED BODY FOR TOOLS

[75] Inventors: Tomohiro Fukaya; Tetsuo Nakai; Mitsuhiro Goto, all of Hyogo, Japan

[73] Assignee: Sumitomo Electric Industries, Ltd., Osaka, Japan

[21] Appl. No.: 451,441

[22] Filed: Dec. 13, 1989

[30] Foreign Application Priority Data

Mar. 7, 1989 [JP] Japan .................................. 1-52962
Mar. 7, 1989 [JP] Japan .................................. 1-52963

[51] Int. Cl.$^5$ ..................... C04B 35/56; C22C 29/02; C22C 29/14
[52] U.S. Cl. ........................................ 501/87; 501/96; 75/241; 75/244; 420/580
[58] Field of Search .................... 501/87, 96; 420/580, 420/581; 75/239, 241, 244

[56] References Cited

U.S. PATENT DOCUMENTS

| | | | |
|---|---|---|---|
| 4,375,517 | 3/1983 | Watanabe et al. | 501/87 |
| 4,693,746 | 9/1987 | Nakai et al. | 75/244 |
| 4,911,756 | 3/1990 | Nakai et al. | 75/244 |

FOREIGN PATENT DOCUMENTS

| | | | |
|---|---|---|---|
| 53-77811 | 7/1978 | Japan . | |
| 97579 | 6/1984 | Japan . | 501/96 |
| 228451 | 10/1987 | Japan . | |

*Primary Examiner*—R. Dean
*Assistant Examiner*—George Wyszomierski
*Attorney, Agent, or Firm*—W. G. Fasse; D. H. Kane, Jr.

[57] ABSTRACT

A hard sintered body for tools is obtained by sintering under a superhigh pressure, a sinter powder mixture containing at least 20 percent by volume and not more than 70 percent by volume of cubic boron nitride powder and having a remainder formed of a binder powder mixture. The binder contains at least 2 percent by weight and not more than 20 percent by weight of Al and at least 2 percent by weight and not more than 20 percent by weight of W, and has a remainder formed of a Ti compound or compounds. The atomic ratio of Ti contained in the binder to a transition metal element or elements belonging to any of the groups IVa, Va and/or VIa of the periodic table including Ti is at least ⅔ and not more than 97/100. In the structure of the sintered body, cubic boron nitride crystals are bonded with each other through bonding phases formed by the binder. For forming the sintered body, at least one or more Ti compounds are selected from a group of $TiN_z$, $Ti(C,N)_z$, $TiC_z$, $(Ti,M)N_z$, $(Ti, M) (C,N)_z$ and $(Ti,M)C_z$, wherein M represents a transition metal element or elements belonging to any one of the groups IVa, Va and/or VIa of the periodic table excluding Ti, and z is within the range of $0.1 \leq z \leq 0.40$. Such a sintered body has an excellent crater wear resistance, so that it can be used for making tool inserts for high-speed cutting of steel or cast iron.

6 Claims, No Drawings

HARD SINTERED BODY FOR TOOLS

FIELD OF THE INVENTION

The present invention relates to an improvement in a hard sintered body for tools made of cubic boron nitride, hereinafter referred to as CBN.

BACKGROUND INFORMATION

CBN is the hardest material next to diamond, and a sintered body prepared from the same is applied to various cutting tools. Japanese Patent Laying-Open No. 53-77811 (1978) discloses an example of such a CBN sintered body suitable for cutting tools.

The sintered body disclosed in the above prior art contains 80 to 40 percent by volume of CBN and has a remainder mainly formed of a carbide, nitride, boride or silicide of a transition metal belonging to the group IVa, Va or VIa of the periodic table or a mixture or solid solution compound thereof, with addition of Al and/or Si. In this CBN sintered body, the aforementioned compound forms continuous bonding phases in the structure of the sintered body.

In the aforementioned hard sintered body for tools, a bonding compound is prepared from a carbide, nitride, boride or silicide of a transition metal belonging to any of the groups IVa, Va or VIa of the periodic table or a solid solution compound thereof. Since such a compound has an excellent thermal conductivity and a high hardness, the sintered body generally exhibits a high performance when the same is used in a cutting tool.

However, when the sintered body which is disclosed in Japanese Patent Laying-Open No. 53-77811 (1978) and now on the market, is used for a high-speed cutting of steel, for example, so-called crater wear develops depending on the cutting conditions, to relatively shorten the life of the cutting tool.

SUMMARY OF THE INVENTION

Accordingly, it is an object of the present invention to provide a hard sintered body for tools, which is superior in crater wear resistance to the aforementioned conventional CBN sintered body and capable of high-speed cutting of steel.

It has been found that this object has been attained by sintering a powder mixture containing at least 20 percent by volume and not more than 70 percent by volume of CBN powder and having a remainder formed of binder powder described below, whereby the sintering takes place under CBN-stable conditions and under a superhigh pressure.

According to the present invention there is provided a sintered body which is obtained by mixing CBN powder with a binder powder containing 2 to 20 percent by weight of Al in the form of either Al or a compound of Al and Ti, and 2 to 20 percent by weight of W in the form of W, WC or a compound of W and Ti, or further containing 1 to 10 percent by weight of one or more metals from the iron group, and having a remainder formed of one or more Ti compound selected from a group of $TiN_z$, $TiC_z$, $Ti(C,N)_z$, $(Ti,M)N_z$, $(Ti,M)C_z$ and $(Ti,M)(C,N)_z$, where M represents transition metal element(s) belonging to any one of the groups IVa, Va and/or VIa of the periodic table excluding Ti and wherein z is within the range of 0.1 z 0.40, such that the atomic ratio of Ti to a transition metal element or elements belonging to any one of the groups IVa, Va and/or VIa of the periodic table including Ti is at least $\frac{3}{8}$ and not more than 97/100. This CBN binder powder mixture is sintered under a superhigh pressure.

The CBN sintered body according to the present invention contains at least one or more Ti compounds selected from a group of TiN, TiC, Ti(C,N), (Ti,M)N, (Ti,M)C and (Ti,M)(C,N), titanium boride, aluminum boride, aluminum nitride, a tungsten compound and tungsten in addition to cubic boron nitride, or further containing one or more metal compounds from the iron group. In such a sintered body of the invention the CBN particles are joined to each other by bonding phases in the structure of the sintered body.

For the following reasons a sintered body according to the present invention has an excellent crater wear resistance.

It is generally considered that crater wear is developed since a binder is abraded due to friction on a tool cutting face caused by high-temperature shavings, whereby CBN particles are caused to fall out of the bonding and leave craters. In order to improve the crater wear resistance of a CBN sintered body, it is thus necessary to improve the wear resistance of the binder under a high temperature and strongly join the binder and CBN or constituents of the binder themselves with each other, while the strength of the binder and the junction strength between CBN and the binder or the constituents of the binder themselves must not be reduced under a high operating temperature which is applied to the tool cutting face during cutting.

According to the present invention, the Ti compound or compounds and Al contained in the binder react with CBN during sintering under high temperature/high pressure to generate titanium boride, aluminum boride, titanium nitride and aluminum nitride, thereby to strongly join or bond CBN with the binder. In particular, excessive Ti contained in one or more Ti compounds selected from the group of $TiN_z$, $TiC_z$, $Ti(C,N)_z$, $(Ti,M)N_z$, $(Ti,M)C_z$ and $(Ti,M)(C,N)$hd z, where M represents a transition metal element belonging to any one of the groups IVa, Va and/or VIa of the periodic table excluding Ti, and wherein z is within the range of $0.1 \leq z \leq 0.40$, easily reacts with CBN crystals to form $TiB_2$ and TiN.

The formation of $TiB_2$ is beneficial since $TiB_2$ has a high hardness, an excellent wear resistance and a high junction strength with CBN and the binder, and these characteristics do not deteriorate even if a high operating temperature is applied. The value of z in the above general formulas of the Ti compounds is within a range of $0.1 \leq z \leq 0.40$ since the formation of $TiB_2$ is reduced if the value of z exceeds 0.40 whereby the strength and the wear resistance of the binder are undesirably reduced. If the value of z is less than 0.1, on the other hand, the metal Ti remains in the binder contained in the sintered body, whereby the wear resistance of the binder deteriorates.

The binder strength and the wear resistance of the binder are further increased by solution-treating or mixing a nitride or nitrides and carbo-nitride or carbo-nitrides of a transition metal or metals belonging to any one of the groups IVa, Va and/or VIa of the periodic table with a nitride and a carbo-nitride of Ti, to further improve the characteristics of the sintered body as compared to the case of preparing the binder only of a Ti compound or Ti compounds. The atomic ratio of Ti contained in the binder to metal or metals belonging to any one of the groups IVa, Va and/or VIa of the periodic table including Ti must be ⅔ to 97/100. If the Ti content is less than ⅔, the bond strength of the binder and CBN is reduced. When the atomic ratio exceeds 97/100, on the other hand, the wear resistance and strength of the binder are reduced.

The binder contains 2 to 20 percent by weight of Al. The ability of the Al to improve the bond strength of the CBN particles and the binder is reduced if the Al content is less than 2 percent by weight, while the hardness of the binder itself is reduced if the Al content exceeds 20 percent by weight, whereby the wear resistance is also reduced.

The content of W in the form of W, WC or a compound of W and Ti is 2 to 20 percent by weight. The strength of the binder is not improved if the W content is less than 2 percent by weight. If the content of the Ti compound or compounds is reduced and the W content exceeds 20 percent by weight, the junction strength of CBN and the binder is reduced. It has been found that the binder is improved in strength to exhibit excellent characteristics particularly when M represents tungsten in the aforementioned chemical formulas.

The binder preferably contains 1 to 10 percent by weight of one or more metals of the iron group for further increasing the strength and hardness of the sintered body. This further improvement may be due to the fact that the metals of the iron group are highly wettable with borides such as $TiB_2$ and $AlB_2$, to attain a stronger bonding of the borides contained in the sintered body. If the content of the iron group metal or metals is less than 1 percent by weight, the characteristics are not improved. If the iron metal content exceeds 10 percent by weight, on the other hand, the binder strength itself and the binder hardness are reduced. The metals of the iron group include Fe, Co and Ni.

In the sintered body according to the present invention, the CBN particles are held by bonding phases formed by the aforementioned binder. The CBN content is at least 20 percent by volume and not more than 70 percent by volume. If the content of the CBN particles is less than 20 percent by volume, the hardness of the CBN sintered body is reduced. If the content of the CBN particles exceeds 70 percent by volume, on the other hand, the toughness of the sintered body is reduced and performance of the cutting tool deteriorates.

The hard sintered body according to the invention has excellent junction strength of CBN and the binder or constituents of the binder, whereby a particularly excellent crater wear resistance is achieved making the present sintered bodies suitable for high speed cutting tools for cutting steel or cast iron.

DESCRIPTION OF THE PREFERRED EMBODIMENTS AND OF THE BEST MODE

Example 1

Nitride powder or carbo-nitride powder containing Ti was mixed with aluminum powder and WC powder to prepare a binder powder mixture having an average particle size of not more than 1 μm. The mixing was performed in a container with a ball of cemented carbide in the container, as shown in Table 1. The binder powder mixture was then further mixed with CBN powder materials of not more than 3μm in particle size in a volume ratio of 45:55 to prepare a sinter powder mixture for sintering. Circular plates of cemented carbide composed of WC - 10 wt. % Co were introduced into Mo vessels, which were then filled with the sinter powder mixture. The vessels were introduced into a superhigh pressure/temperature apparatus, and sintered under a pressure of 50 kb and a temperature of 1250° C. for 25 minutes.

Sintered bodies thus obtained were examined by an X-ray diffraction, to observe peaks which are believed to be those of CBN, nitrides, carbides and carbo-nitrides containing Ti, $TiB_2$, $AlB_2$, AlN and borides and carbides of W, or W.

Table 2 shows Vickers hardness values of these sintered bodies which were worked into inserts for cutting tools for cutting round bars of 100 mm in diameter made of SUJ2 ($H_{RC}$:59 to 61). The cutting conditions were as follows:

Cutting Speed: 210 m/min.
Depth of Cut: 0.15 mm
Feed Rate: 0.1 mm/rev.
Type: Dry Table 2 also shows the time durations during which a tool of the invention could perform a cutting operation before cutting edge chipping occurred.

Referring to Table 1, the column of "Atomic Ratio Ti:M" shows the atomic ratios of Ti to transition metal elements belonging to any of the groups IVa, Va and/or VIa of the periodic table excluding Ti.

Referring to Tables 1 and 2, samples Nos. 8 to 12 were prepared as reference examples. The underlined values shown in Table 1 for the reference examples are out of the range of the composition according to the present invention.

TABLE 1

| Sample No. | Composition of Binder (wt. %) | Atomic Ratio Ti:M |
|---|---|---|
| Example | | |
| 1 | 75$TiN_{0.1}$, 10Al, 15WC | 95.2:4.8 |
| 2 | 70$TiC_{0.2}$, 20Al, 10WC | 96.5:3.5 |
| 3 | 75$(Ti_{0.9}Zr_{0.1})N_{0.3}$, 5Al, 20WC | 92.9:7.1 |
| 4 | 83$(Ti_{0.8}W_{0.1}Hf_{0.1})(C_{0.2}N_{0.8})_{0.4}$, 15$Al_3Ti$, 2WC | 84.1:15.9 |
| 5 | 75$(Ti_{0.8}Cr_{0.15}M_{0.05})(C_{0.4}N_{0.6})_{0.18}$, 17Al, 2WC, | 77.7:22.3 |
| 6 | 75$(Ti_{0.9}Nb_{0.05}V_{0.05})(C_{0.8}N_{0.2})_{0.25}$, 17Al, 2WC, | 84.5:15.5 |
| 7 | 83$(Ti_{0.8}Ta_{0.1}Cr_{0.1})(C_{0.5}N_{0.5})_{0.33}$, 2Al, 15WC, | 75.9:24.1 |
| Reference Example | | |
| 8 | 80$TiN_{\underline{0.5}}$, 10Al, 10WC | 96.6:3.4 |
| 9 | 68$(Ti_{0.8}Zr_{0.1}Hf_{0.1})(C_{0.1}N_{0.9})_{0.35}$, <u>25Al</u>, 7WC | 11.2:22.8 |
| 10 | 80$(Ti_{0.9}W_{0.1})C_{0.25}$, <u>1Al</u>, 18WC | 70.7:29.3 |
| 11 | 55$(Ti_{0.8}Ta_{0.05}Hf_{0.15})(C_{0.5}N_{0.5})_{0.20}$, 15Al, <u>30WC</u> | <u>50.1:49.9</u> |
| 12 | 81$(Ti_{0.9}V_{0.1})(C_{0.8}N_{0.2})_{0.30}$, 18Al, <u>1WC</u> | 89.7:10.3 |

TABLE 2

| | Sample No. | Vickers Hardness | Cutting Durations Before Chipping (min.) |
|---|---|---|---|
| Example | 1 | 3400 | 55 |
| | 2 | 3350 | 48 |
| | 3 | 3450 | 52 |
| | 4 | 3300 | 59 |
| | 5 | 3300 | 57 |
| | 6 | 3450 | 53 |
| | 7 | 3400 | 51 |
| Reference Example | 8 | 2950 | 23 |
| | 9 | 2900 | 22 |
| | 10 | 2800 | 14 |
| | 11 | 2850 | 18 |

TABLE 2-continued

| Sample No. | Vickers Hardness | Cutting Durations Before Chipping (min.) |
| --- | --- | --- |
| 12 | 2800 | 15 |

Example 2

Powder materials of 76 percent by weight of $(Ti_{0.9}Zr_{0.1})(C_{0.5}N_{0.5})_{0.25}$, 12 percent by weight of Al and 12 percent by weight of WC were mixed with each other to obtain a binder powder mixture having particles of not more than 1 μm in size. The binder powder mixture contains Ti and W in an atomic ratio of 86.1:13.9. This binder powder was mixed with CBN powder to prepare a sinter powder mixture as shown in Table 3.

The sinter powder mixture thus obtained was sintered under a superhigh pressure similarly to Example 1 to obtain sintered bodies, which were made into inserts for cutting tools. The cutting tools with these inserts were used to cut outer peripheries of round bars of 300 mm in diameter made of SCM435 ($H_{RC}$:22). The cutting conditions were as follows:

Cutting Speed: 580 m/min.
Depth of Cut: 0.6 mm
Feed Rate: 0.2 mm/rev.
Type: Dry

Table 3 shows the time durations during which the cutting could be performed before cutting edge chipping occurred. Referring to Table 3, samples Nos. 18 and 19 were prepared as reference examples. The underlined values of the reference examples are out of the range of CBN content according to the present invention.

TABLE 3

|  | Sample No. | cBN Particle Size | cBN Content (vol. %) | Cutting Durations Before Chipping (min.) |
| --- | --- | --- | --- | --- |
| Example | 13 | not more than 5 μm | 50 | 115 |
|  | 14 | 3~5 μm | 40 | 105 |
|  | 15 | not more than 3 μm | 70 | 103 |
|  | 16 | " | 50 | 121 |
|  | 17 | " | 20 | 95 |
| Reference Example | 18 | " | <u>80</u> | 12 |
|  | 19 | " | <u>10</u> | 4 |

Example 3

Powder materials of $(Ti_{0.9}V_{0.05}Nb_{0.05})(C_{0.2}N_{0.8})_z$ having z values shown in Table 4 were mixed with Al powder materials and WC powder materials in ratios of 80:12:8 in weight percentage, to obtain binder powder mixtures having particle sizes of not more than 1 μm. These binder powder mixtures were mixed with CBN powder materials having a particle size of 3 to 5μm, in a volume ratio of 50:50, to prepare a sinter powder mixture.

The sinter powder mixture thus obtained was sintered under a superhigh pressure similarly to Example 1, to obtain sintered bodies. Table 4 also shows Vickers hardness values of these sintered bodies.

The above sintered bodies were made into inserts for cutting tools, to cut outer peripheries of round bars of 80 mm in diameter made of SKD11:60). The cutting conditions were as follows:

Cutting Speed: 230 m/min.
Depth of Cut: 0.15 mm
Feed Rate: 0.08 mm/rev.
Type: Dry Table 4 also shows the time durations before cutting edge chipping of these inserts.

Referring to Table 4, the column "Atomic Ratio Ti:M" shows the ratios of Ti contained in the binders to transition metal elements belonging to any one of the groups IVa, Va and/or VIa of the periodic table excluding Ti. Samples Nos. 20, 25, 26 and 27 were prepared as reference examples, whereby the underlined values are out of the range of the z values according to the present invention.

TABLE 4

| Sample No. | z-Value in Ti Compound | Atomic Ratio Ti:M | Vickers Hardness | Cutting Duration Before Chipping (min.) |
| --- | --- | --- | --- | --- |
| Reference Example |  |  |  |  |
| 20 | <u>0.05</u> | 87.7:12.3 | 2800 | 25 |
| Example |  |  |  |  |
| 21 | 0.1 | 87.7:12.3 | 3400 | 57 |
| 22 | 0.2 | 87.6:12.4 | 3400 | 52 |
| 23 | 0.3 | 87.6:12.4 | 3300 | 57 |
| 24 | 0.4 | 87.5:12.5 | 3250 | 50 |
| 25 | <u>0.45</u> | 87.5:12.5 | 3150 | 48 |
| Reference Example |  |  |  |  |
| 26 | <u>0.5</u> | 87.5:12.5 | 2950 | 27 |
| 27 | <u>0.6</u> | 87.4:12.6 | 2950 | 24 |

Example 4

The binder powder mixtures shown in Table 5 were prepared in a similar manner as in example 1. These binder powder mixtures were further mixed with CBN powders having particle sizes of not more than 2 μm in a volume ratio of 70:30, to obtain sinter powder mixtures. These sinter powder mixtures were sintered under a superhigh pressure and temperature similarly to Example 1, to obtain sintered bodies. Table 5 shows Vickers hardness values of these sintered bodies.

Then the sintered bodies were made into inserts for cutting tools to cut outer peripheries of round bars of 70 mm in diameter made of carburizing steel of SNCM415 ($H_{RC}$:58 to 61). The cutting conditions were as follows:

Cutting Speed: 180 m/min.
Depth of Cut: 0.1 mm
Feed Rate: 0.08 mm/rev.
Type: Dry Table 6 shows cutting-available times.

Referring to Table 5, the column "Atomic Ratio Ti:M" shows the ratios of Ti contained in the binders to transition metal elements belonging to any one of the groups IVa, Va and/or VIa of the periodic table excluding Ti. Samples Nos. 31 to 33 were prepared as reference examples. The underlined values of these reference examples shown in Table 5 are out of the range of composition according to the present invention.

TABLE 5

| Sample No. | Composition of Binder (wt. %) | Atomic Ratio Ti:M |
| --- | --- | --- |
| Example |  |  |
| 28 | 83($Ti_{0.9}Zr_{0.1}$)($C_{0.1}N_{0.9}$)$_{0.30}$, 9Al, 8WC | 87.6:12.4 |

TABLE 5-continued

| Sample No. | Composition of Binder (wt. %) | Atomic Ratio Ti:M |
|---|---|---|
| 29 | 78(Ti$_{0.95}$Hf$_{0.05}$)(C$_{0.3}$N$_{0.7}$)$_{0.43}$, 18Al, 4WC | 93.5:6.5 |
| 30 | 79Ti(C$_{0.5}$N$_{0.5}$)$_{0.12}$, 6Al, 15WC | 94.6:5.4 |
| Reference Example | | |
| 31 | 70(Ti$_{0.85}$Cr$_{0.05}$Ta$_{0.1}$)C$_{0.52}$, 12Al$_3$Ti, 18WC | 78.1:21.9 |
| 32 | 67(Ti$_{0.9}$Nb$_{0.1}$)(C$_{0.9}$N$_{0.1}$)$_{0.25}$, 28Al, 5WC | 88.1:11.9 |
| 33 | 62(Ti$_{0.9}$Mo$_{0.1}$)(C$_{0.8}$N$_{0.2}$)$_{0.33}$, 8Al, 30WC | 78.9:21.1 |

TABLE 6

| | Sample No. | Vickers Hardness | Cutting Duration Before Chipping (min.) |
|---|---|---|---|
| Example | 28 | 3250 | 52 |
| | 29 | 3200 | 55 |
| | 30 | 3400 | 50 |
| Reference Example | 31 | 2950 | 11 |
| | 32 | 2700 | 3 |
| | 33 | 2700 | 9 |

Example 5

Nitride or carbo-nitride powder materials containing Ti were mixed with aluminum powder materials, metal group powder materials and WC powder materials, to prepare a binder powder mixture having an average particle size of not more than 1 μm. The mixture was prepared in a container holding a ball of cemented carbide, as shown in Table 7. The binder powder mixture was mixed with CBN powder materials having a particle size of not more than 3 μm, in a volume ratio of 45:55, to prepare a sinter powder mixture. Circular plates of cemented carbide composed of WC - 10 wt. % Co were introduced into Mo vessels, which were then filled with the mixed powder materials. Then the vessels were introduced into a superhigh pressure/temperature apparatus, and sintered under a pressure of 51 kb and a temperature of 1300° C. for 20 minutes.

Sintered bodies thus obtained were examined by X-ray diffraction. Observed peaks are considered to be those of nitrides, carbides and carbo-nitrides containing Ti, TiB$_2$, AlB$_2$, AlN and borides and carbides of W, or W in all of the sintered bodies. Table 8 shows Vickers hardness values of these sintered bodies.

The aforementioned respective sintered bodies were made into inserts for cutting tools, to cut outer peripheries of round bars of 100 mm in diameter made of SKD11 (H$_{RC}$:60 to 62). The cutting conditions were as follows:

Cutting Speed: 230 m/min.
Depth of Cut: 0.2 mm
Feed Rate: 0.12 mm/rev.
Type: Dry Table 8 also shows the time durations during which cutting was performed before cutting edge chipping occurred.

Referring to Table 7, the column "Atomic Ratio Ti:M" shows the atomic ratios of Ti to transition metal elements belonging to any one of the groups IVa, Va and/or VIa of the periodic table excluding Ti.

Referring to Tables 7 and 8, samples Nos. 41 to 47 were prepared as reference examples, whereby the underlined values are out of the range of composition according to the present invention.

TABLE 7

| Sample No. | Composition of Binder (wt. %) | Atomic Ratio Ti:M |
|---|---|---|
| Example | | |
| 34 | 78(Ti$_{0.9}$W$_{0.1}$)(C$_{0.1}$N$_{0.9}$)$_{0.20}$, 5Al, 15WC, 2Fe | 84.7:15.3 |
| 35 | 68(Ti$_{0.8}$V$_{0.1}$Hf$_{0.1}$)(C$_{0.5}$N$_{0.5}$)$_{0.30}$, 15Al, Ti, 12WC, 5Ni | 77.9:22.1 |
| 36 | 82(Ti$_{0.95}$Cr$_{0.05}$)(C$_{0.8}$N$_{0.2}$)$_{0.10}$, 12Al, 2WC, 4Co | 94.4:5.6 |
| 37 | 62Ti(C$_{0.9}$N$_{0.1}$)$_{0.40}$, 20Al, 8WC, 10Co | 96.6:3.4 |
| 38 | 65(Ti$_{0.9}$Cr$_{0.1}$)C$_{0.10}$, 7Al, 20WC, 8Ni | 87.0:17.0 |
| 39 | 79(Ti$_{0.85}$Nb$_{0.05}$Ta$_{0.1}$)N$_{0.25}$, 2Al, 18WC, 1Fe | 78.9:21.1 |
| 40 | 79(Ti$_{0.9}$Mo$_{0.1}$)(C$_{0.4}$N$_{0.6}$)$_{0.33}$, 13Al, 5WC, 3Ni | 88.4:11.6 |
| Reference Example | | |
| 41 | 79(Ti$_{0.9}$Nb$_{0.05}$W$_{0.05}$)(C$_{0.1}$N$_{0.9}$)$_{0.52}$, 10Al, 13WC, 5Co | 85.0:15.0 |
| 42 | 61(Ti$_{0.9}$Ta$_{0.1}$)C$_{0.40}$, 22Al, 8WC, 9Fe | 86.7:13.3 |
| 43 | 82TiN$_{0.33}$, 1Al, 10WC, 7Ni, | 96.8:3.2 |
| 44 | 57(Ti$_{0.8}$V$_{0.1}$Mo$_{0.1}$)(C$_{0.7}$N$_{0.5}$)$_{0.15}$, 12Al, 25WC, 6Co | 71.2:28.8 |
| 45 | 81(Ti$_{0.8}$Hf$_{0.2}$)C$_{0.35}$, 9Al, 1WC, 3Fe | 79.6:20.4 |
| 46 | 70(Ti$_{0.9}$Zr$_{0.1}$)(C$_{0.7}$N$_{0.3}$)$_{0.38}$, 5Al, 12WC, 13Co | 85.7:14.3 |
| 47 | 79.5(Ti$_{0.85}$V$_{0.15}$)(C$_{0.2}$N$_{0.8}$)$_{0.22}$, 12Al, 8WC, 0.5Ni | 82.8:17.2 |

TABLE 8

| | Sample No. | Vickers Hardness | Cutting Duration Before Chipping (min.) |
|---|---|---|---|
| Example | 34 | 3300 | 61 |
| | 35 | 3250 | 58 |
| | 36 | 3400 | 65 |
| | 37 | 3200 | 60 |
| | 38 | 3400 | 59 |
| | 39 | 3300 | 55 |
| | 40 | 3250 | 54 |
| Reference | 41 | 3100 | 29 |
| | 42 | 3000 | 23 |
| | 43 | 2900 | 10 |
| | 44 | 2950 | 7 |
| | 45 | 3050 | 28 |
| | 46 | 2900 | 3 |
| | 47 | 3100 | 45 |

Example 6

Powder materials of Ti$_{0.9}$W$_{0.1}$)N$_{0.20}$, Al, WC and one or more metals of the iron group were mixed in ratios of 75:12:10:3 in weight percentage, to obtain a binder powder mixture having a particle size of not more than 1 μm. This binder contains Ti and W in an atomic ratio of 86.2:13.8. Such binder powder materials were mixed with CBN powder materials to form a sinter powder mixture as shown in Table 9.

The sinter powder mixture thus obtained was sintered under a superhigh pressure and temperature similarly to Example 5, to obtain sintered bodies. The sintered bodies were made into inserts for cutting tools.

The inserts were applied to cut outer peripheries of round bars of 300 mm in diameter made of SCM435 (H$_{RC}$:22). The cutting conditions were as follows:

Cutting Speed: 560 m/min.

Depth of Cut: 1.0 mm
Feed Rate: 0.5 mm/rev.
Type: Dry

Table 9 also shows the cutting duration before chipping of the cutting edge of the insert occurred.

Samples Nos. 53 and 54 were prepared as reference examples, whereby the underlined values are out of the range of CBN contents according to the present invention.

TABLE 9

|  | Sample No. | cBN Particle Size | cBN Content (vol. %) | Cutting Durations Before Chipping (min.) |
|---|---|---|---|---|
| Example | 48 | not more than 8 μm | 60 | 105 |
|  | 49 | 3~5 μm | 40 | 98 |
|  | 50 | " | 70 | 112 |
|  | 51 | not more than 3 μm | 50 | 125 |
|  | 52 | " | 20 | 94 |
| Reference | 53 | " | <u>10</u> | 5 |
| Example | 54 | " | <u>80</u> | 13 |

Example 7

$(Ti_{0.8}Zr_{0.1}Ta_{0.1})(C_{0.4}N_{0.6})_z$ powder materials having z values shown in Table 10 were mixed with Al, WC and Co powder materials in ratios of 70:15:12:3 in weight percentage to obtain a binder powder mixture having a particle size of not more than 1 μm. The binder powder mixture was further mixed with CBN powder materials in a volume ratio of 40:60 to prepare a sinter powder mixture.

The so obtained sinter powder mixture was sintered under a superhigh pressure and temperature similarly to Example 5, to obtain sintered bodies. Table 10 also shows Vickers hardness values of these sintered bodies.

The sintered bodies thus obtained were made into inserts for cutting work, to cut outer peripheries of round bars of 80 mm in diameter made of SUJ2 ($H_{RC}$:60). The cutting conditions were as follows:

Cutting Speed: 250 m/min.
Depth of Cut: 0.13 mm
Feed Rate: 0.10 mm/rev.
Type: Dry Table 10 also shows cutting time durations before cutting edge chipping occurred.

Referring to Table 10, the column "Atomic Ratio Ti:M" shows the ratios of Ti contained in the binders to transition metal elements belonging to any one of the groups IVa, Va and/or VIa of the periodic table excluding Ti.

Samples Nos. 55, and 59 to 62 were prepared as reference examples, whereby the underlined values are out of the range of z values according to the present invention.

TABLE 10

| Sample No. | z-Value | Atomic Ratio Ti:M | Vickers Hardness | Cutting Duration Before Chipping (min.) |
|---|---|---|---|---|
| Reference Example |  |  |  |  |
| 55 | <u>0.05</u> | 75.7:24.3 | 2800 | 25 |
| Example |  |  |  |  |
| 56 | 0.10 | 75.6:24.4 | 3100 | 53 |
| 57 | 0.25 | 75.5:24.5 | 3400 | 68 |
| 58 | 0.33 | 75.4:24.6 | 3300 | 62 |
| Reference Examples |  |  |  |  |

TABLE 10-continued

| Sample No. | z-Value | Atomic Ratio Ti:M | Vickers Hardness | Cutting Duration Before Chipping (min.) |
|---|---|---|---|---|
| 59 | <u>0.42</u> | 75.3:24.7 | 3250 | 55 |
| 60 | <u>0.45</u> | 75.3:24.7 | 3150 | 48 |
| 61 | <u>0.50</u> | 75.2:24.8 | 3000 | 20 |
| 62 | <u>0.55</u> | 75.2:24.8 | 2950 | 18 |

Example 8

The binder powder materials shown in Table 11 were prepared in a similar manner to Example 5, to form a binder powder mixture which was further mixed with CBN powder materials having a particle size of not more than 2 μm, in a volume ratio of 70:30, to obtain a sinter powder mixture.

Then the sinter powder mixture was sintered under a superhigh pressure similarly to Example 5, to obtain sintered bodies. Table 11 shows Vickers hardness values of these sintered bodies.

The sintered bodies were made into inserts for cutting tools, to cut outer peripheries of nitrided round bars of 100 mm in diameter made of SNCM645 ($H_{RC}$:67). The cutting conditions were as follows:

Cutting Speed: 180 m/min.
Depth of Cut: 0.07 mm
Feed Rate: 0.08 mm/rev.
Type: Dry Table 12 shows the cutting durations before chipping of the insert cutting edges.

Referring to Table 11, the column "Atomic Ratio Ti:M" shows the ratios of Ti contained in the binders to transition metal elements belonging to any of the groups IVa, Va and/or VIa of the periodic table excluding Ti.

Samples Nos. 66 to 68 were prepared as reference examples, whereby the underlined values are out of the range of composition according to the present invention.

TABLE 11

| Sample No. | Composition of Binder | Atomic Ratio Ti:M |
|---|---|---|
| Example |  |  |
| 63 | 74($Ti_{0.9}Mo_{0.1}$)($C_{0.3}N_{0.7}$)$_{0.10}$, 8Al, 15WC, 3Fe | 85.2:14.8 |
| 64 | 69($Ti_{0.9}V_{0.0}$)($C_{0.9}N_{0.1}$)$_{0.35}$, 4Al, 19WC, 8Ni | 83.8:16.2 |
| 65 | 74($Ti_{0.9}Nb_{0.1}$)$N_{0.22}$, 18Al, 3WC, 5Co | 89.0:11.0 |
| Reference Example |  |  |
| 66 | 78($Ti_{0.9}Cr_{0.05}Ta_{0.05}$)($C_{0.2}N_{0.8}$)<u>$_{0.48}$</u>, 11Al, 8WC, 3Co | 87.2:12.8 |
| 67 | 64Ti($C_{0.1}N_{0.9}$)$_{0.33}$, <u>24Al</u>, 10WC, 2Ni | 96.0:4.0 |
| 68 | 54($Ti_{0.9}Ta_{0.1}$)$C_{0.30}$, 12Al, <u>22WC</u>, 12Fe | 79.3:20.7 |

TABLE 12

|  | Sample No. | Vickers Hardness | Cutting Duration Before Chipping (min.) |
|---|---|---|---|
| Example | 63 | 3350 | 58 |
|  | 64 | 3300 | 62 |
|  | 65 | 3400 | 55 |
| Reference Example | 66 | 3100 | 23 |
|  | 67 | 2950 | 15 |
|  | 68 | 2700 | 4 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hard sintered body for tools obtained by sintering a sinter powder mixture containing at least 20 percent by volume and not more than 70 percent by volume of cubic boron nitride powder and having a remainder formed of binder powder, said sintered body having been formed under a superhigh pressure, said binder containing at least 2 percent by weight and not more than 20 percent by weight of Al and at least 2 percent by weight and not more than 20 percent by weight of W, having a remainder formed of one or more Ti compounds selected from a group consisting of $TiN_z$, $Ti(C,N)_z$, $TiC_z$, $(Ti,M)N_z$, $(Ti,M)(C,N)_z$ and $(Ti,M)C_z$, where M represents a transition metal element or elements belonging to any one of the groups IVa, Va and VIa of the periodic table excluding Ti, and wherein z is within the range of 0.1 to 0.4, said binder further containing said Al in the form of at least one of Al and a compound of Al and Ti, and said W in the form of at least one of W, WC and a compound of W and Ti, wherein the atomic ratio of said Ti to a transition metal element or metal elements belonging to any one of the groups, VIa, Va and VIa of the periodic table including Ti is at least ⅔ and not more than 97/100, and wherein cubic boron nitride crystals are bonded to each other through bonding phases formed by said binder in said sintered body.

2. The hard sintered body for tools in accordance with claim 1, containing at least one Ti compound selected from a group consisting of TiN, TiC, Ti(C,N), (Ti,M)N, (Ti,M)C and (Ti,M)(C,N), titanium boride, aluminum boride, aluminum nitride, a tungsten compound and tungsten in addition to said cubic boron nitride, said tungsten compound being selected from the group consisting of tungsten carbide, tungsten carbide including at least one of titanium and aluminum in solid solution, tungsten nitrides and tungsten carbo-nitrides.

3. The hard sintered body for tools in accordance with claim 1, wherein said M represents tungsten.

4. The hard sintered body for tools obtained by sintering a sinter powder mixture containing at least 20 percent by volume and not more than 70 percent by volume of cubic boron nitride powder and having a remainder formed of binder powder, said sintered body having been formed under a superhigh pressure, said binder containing at least 2 percent by weight and not more than 20 percent by weight of Al, at least 2 percent by weight and not more than 20 percent by weight of W and at least 1 percent by weight and not more than 10 percent by weight of one or more metals of the iron group, said binder further including a remainder formed of one or more Ti compounds selected from a group of $TiN_z$, $Ti(C,N)_z$, $TiC_z$, $(Ti,M)N_z$, $(Ti,M)(C,N)_z$ and $(Ti,M)C_z$, where N represents a transition metal element or elements belonging to any one of the groups IVa, VA and VIa of the periodic table excluding Ti, and wherein z is within the range of 0.1 to 0.4, said binder further containing said Al in the form of at least one Al and a compound of Al and Ti, and said W in the form of at least one of W, WC and a compound of W and Ti, wherein the atomic ratio of said Ti to a transition metal element or metal elements belonging to any one of the groups IVa, Va and VIa of the periodic table including Ti is at least ⅔ and not more than 97/100, and wherein cubic boron nitride crystals are bonded to each other through bonding phases formed by said binder in the said sintered body.

5. The hard sintered body for tools in accordance with claim 4, containing at least one Ti compound selected from a group consisting of TiN, TiC, Ti(C,N), (Ti,M)N, (Ti,M)C and (Ti,M)(C,N), titanium boride, aluminum boride, aluminum nitride, a tungsten compound and tungsten in addition to said cubic boron nitride, said tungsten compound being selected from the group consisting of tungsten carbide, tungsten carbide including at least one of titanium and aluminum in solid solution, tungsten nitrides and tungsten carbo-nitrides.

6. The hard sintered body for tools in accordance with claim 4, wherein said M represents tungsten.

* * * * *

UNITED STATES PATENT AND TRADEMARK OFFICE
CERTIFICATE OF CORRECTION

PATENT NO. : 5,041,399
DATED : August 20, 1991
INVENTOR(S) : Tomohiro Fukaya; Tetsuo Nakai, Mitsuhiro Goto It is certified that error appears in the above-identified patent and that said Letters Patent is hereby corrected as shown below:

Column 4, Table 1, line 48, replace "11.2:22.8" by --77.2:22.8--.

Column 8, Table 8, line 45, first heading column, insert --Example--.

In the Claims:

Claim 1, column 11, line 29, replace "VIa" (1st. occurrence) by --IVa--.

Claim 4, column 12, line 17, replace "N" by --M--;
line 19, replace "VA" by --Va--;
line 29, delete "the".

Signed and Sealed this

Twenty-second Day of December, 1992

Attest:

DOUGLAS B. COMER

Attesting Officer       Acting Commissioner of Patents and Trademarks